(12) United States Patent
Tamechika

(10) Patent No.: US 8,028,574 B2
(45) Date of Patent: Oct. 4, 2011

(54) ENGINE OIL LEVEL DETECTING DEVICE

(75) Inventor: Takao Tamechika, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 12/431,084

(22) Filed: Apr. 28, 2009

(65) Prior Publication Data

US 2009/0301186 A1 Dec. 10, 2009

(30) Foreign Application Priority Data

Jun. 4, 2008 (JP) ................................ P2008-147404

(51) Int. Cl.
*G01F 23/00* (2006.01)
(52) U.S. Cl. ..................... 73/290 R; 340/615; 340/450.3
(58) Field of Classification Search ........ 73/290 R–334, 73/114.56, 114.01, 290 B, 290 V; 340/615, 340/450.3
See application file for complete search history.

(56) References Cited

FOREIGN PATENT DOCUMENTS

JP    2003-184530 A    7/2003
WO   WO 2007071239 A1 *  6/2007
* cited by examiner

*Primary Examiner* — Hezron Williams
*Assistant Examiner* — Jamar Ray
(74) *Attorney, Agent, or Firm* — Arent Fox LLP

(57) ABSTRACT

An oil level detecting device for detecting an oil level in an oil storing chamber formed in a crankcase of an engine includes a fan, a power generator and an oil level determination unit. The fan is rotated by an oil flow produced by dipping up oil for lubricating the engine. In response to rotation of the fan, the generator generates a corresponding amount of electric power on the basis of which the oil level determination unit determines the oil level.

2 Claims, 6 Drawing Sheets

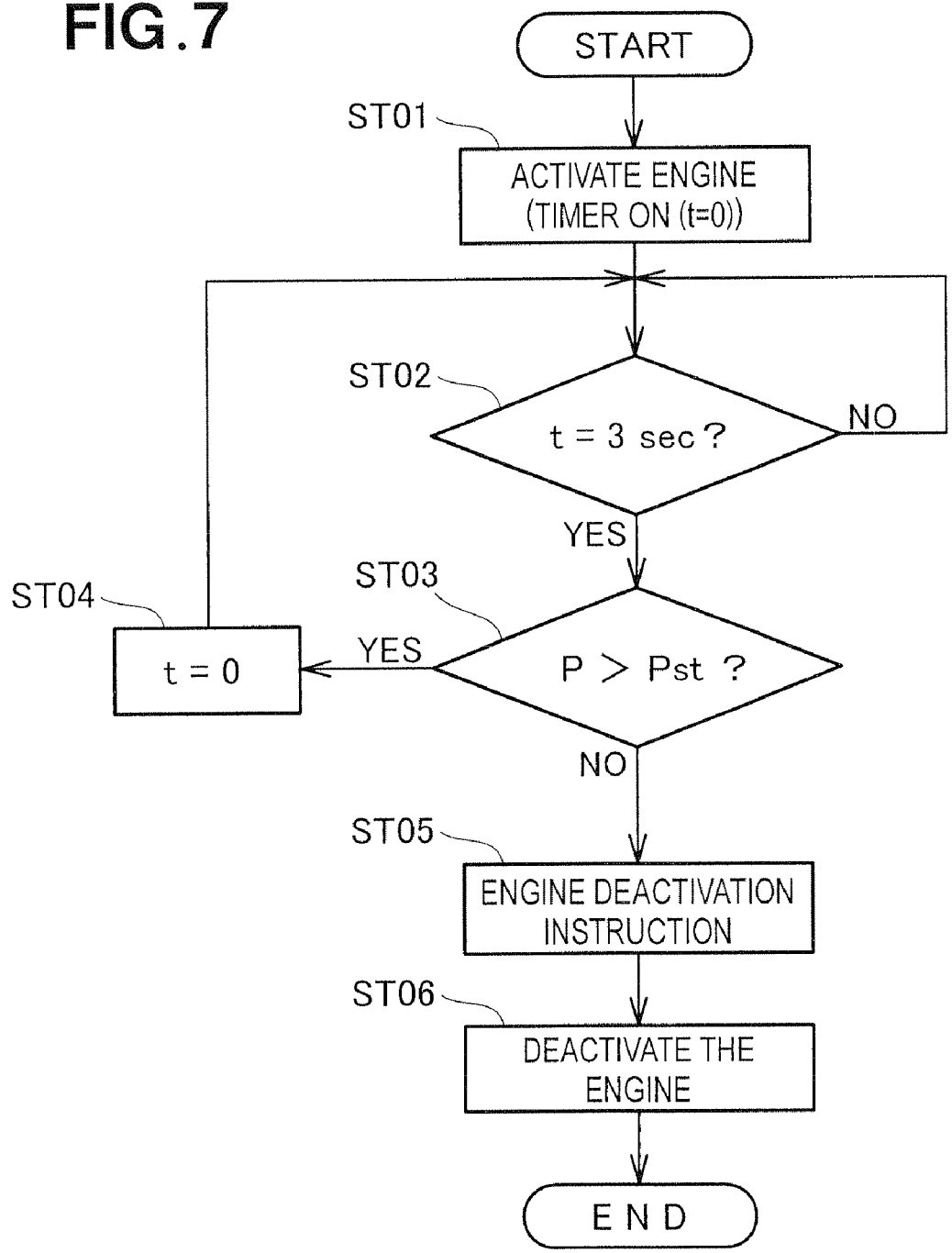

ENGINE OIL LEVEL DETECTING DEVICE

FIELD OF THE INVENTION

The present invention relates to an improvement in an oil level detecting device for detecting an amount of lubricating oil in a general-purpose engine.

BACKGROUND OF THE INVENTION

Among the conventionally-known engine oil level detecting devices are ones wherein a float moves up or down in response to variation in an oil level, one example of which is disclosed in Japanese Patent Application Laid-Open Publication No. 2003-184530.

According to the disclosure of the 2003-184530 publication, a float guide rod extends between upper and lower lids closing the upper and lower ends of an outer cylinder, and a float is mounted on the guide rod so that it moves up or down along the guide rod in response to oil level variation.

If applied to an engine of a type where oil stored in a lower portion of the engine is compulsorily taken up or dipped up to lubricate various component parts of the engine, the disclosed oil level detecting device would present the problem that a surface position of the oil does not stabilize so that it is difficult to accurately detect the oil level using the float.

SUMMARY OF THE INVENTION

In view of the foregoing prior art problems, it is an object of the present invention to provide an improved engine oil level detecting device capable of accurately detecting an oil level even where the engine is of the type in which oil stored in a lower portion of the engine is compulsorily dipped up to lubricate various parts.

To accomplish the above object, the present invention provides an oil level detecting device adapted to be disposed within an oil storing chamber defined in a crankcase of an engine, for detecting a level of oil which is stored in the oil storing chamber, dipped up for lubricating the engine and thus caused to flow within the oil storing chamber, the oil level detecting device comprising: a fan rotatable by a flow of the oil; a power generator operatively connected with the fan to generate electric power corresponding in amount to an amount of rotation of the fan; and oil level determination means for determining the level of oil in the oil storing chamber on the basis of the amount of the electric power generated by the power generator.

As the oil stored in the oil storing chamber is dipped up by an oil dipper, a flow is produced in the stored oil and the fan is rotated by the oil flow, so that electric power is generated by the power generator operatively connected with the fan and the generated power is delivered to the oil level determination means or unit. Then, the oil level determination unit determines the oil level on the basis of an electric voltage, current or amount or level of the generated electric power.

When the level of the stored oil is high, the fan easily rotates at a high speed by a flow of a sufficient amount of the oil, so that the power generator generates great electric power. However, as the level of the stored oil lowers, the flowing amount of the oil decreases so that the fan rotates at a reduced speed, so that the power generator generates reduced electric power. Once the electric power generated by the power generator falls below a predetermined value, the oil level determination unit determines that the oil level in the oil storing chamber has decreased below a predetermined value.

Because the oil level detecting device of the present invention is constructed to determine the current oil level on the basis of electric power generated in response to a flow of the oil, it can detect the oil level with high accuracy even when applied to an engine in which the stored oil is compulsorily dipped up by an oil dipper to lubricate various component parts of the engine. Namely, the oil level detecting device of the present invention can detect the oil level with high accuracy and in a stable manner even when the oil surface fluctuates due to the operation of the oil dipper.

Preferably, the oil level determination means comprises an oil alert unit which, when the amount of the electric power generated by the power generator is larger than a predetermined value, judges the oil within the oil storing chamber to be at a sufficient level and, when the amount of the electric power generated by the power generator is smaller than the predetermined value, judges the oil within the oil storing chamber to be at an insufficient level and outputs a signal for deactivating the engine.

BRIEF DESCRIPTION OF THE DRAWINGS

A preferred embodiment of the present invention will hereinafter be described in detail, by way of example only, with reference to the accompanying drawings, in which:

FIG. 7 is a flowchart showing an operation of the oil level detecting device.

DETAILED DESCRIPTION OF THE PREFERRED EMBODIMENT

Figure 1:
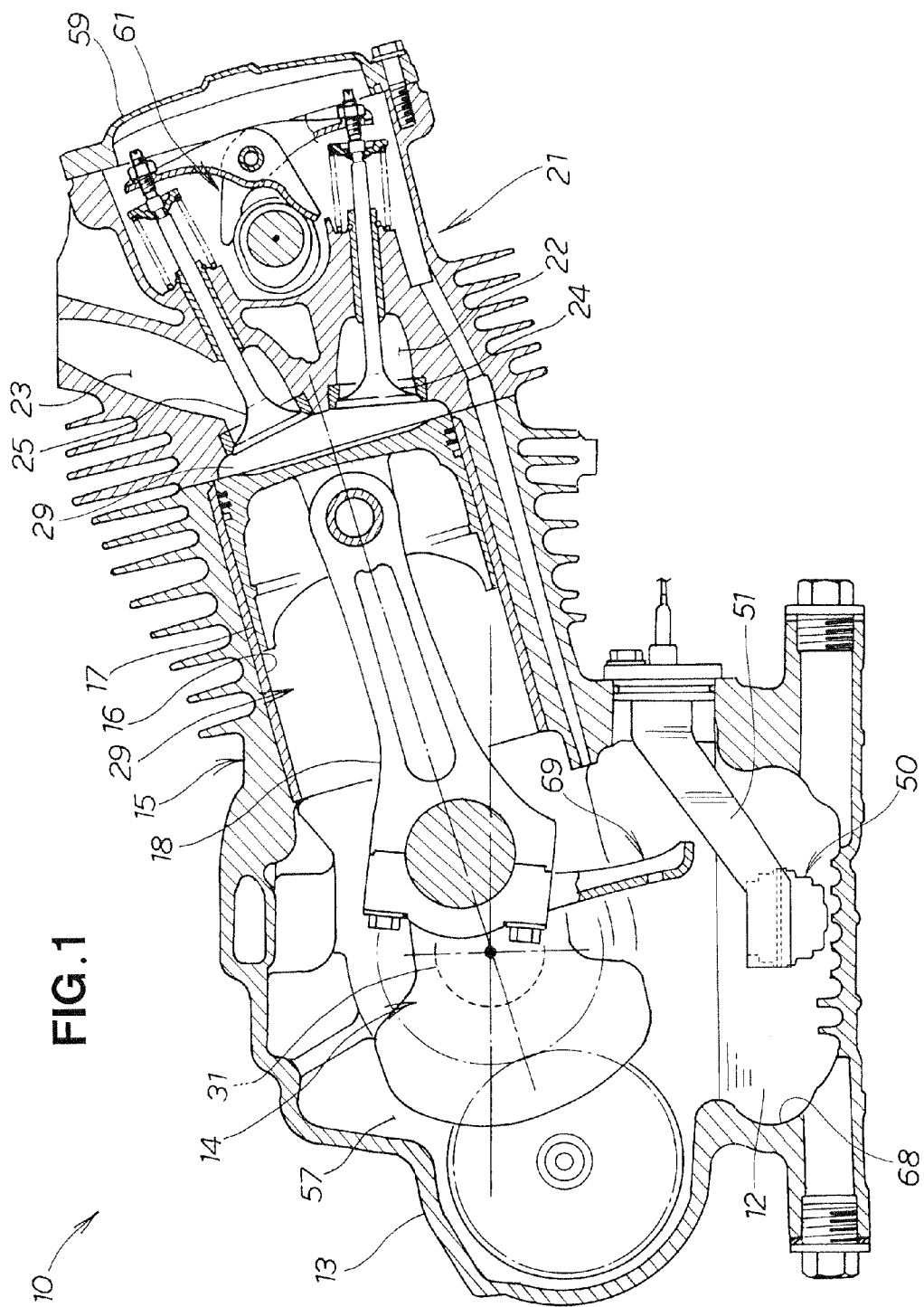
FIG. 1 is a sectional view of an engine provided with an oil level detecting device according to the present invention.

Reference is now made to FIG. 1 showing in section an engine 10 provided with an embodiment of an oil level detecting device 50 of the present invention. The engine 10 is a single-cylinder, air-cooling type engine which includes: a crankcase 13 having lubricating oil 12 stored therein; a crankshaft 14 rotatably mounted in the crankcase 13 and extending in a horizontal direction; a cylinder block 15 integrally formed with the crankcase 13 and extending obliquely; a piston 17 vertically movably inserted in a cylinder bore 16 of the cylinder block 15; a connecting rod 18 interconnecting the piston 17 and the crankshaft 14; a cylinder head 21 fixedly mounted on the cylinder block 15; and a head cover 59 closing an distal end opening of the cylinder head 21.

Crank chamber 57 is provided in the crankcase 13, and an oil storing chamber 68 having oil stored therein is provided in a lower portion of the crank chamber 57. The oil level detecting device 50 for detecting an amount of the oil 12 (i.e., oil level) is provided in the oil storing chamber 68. Reference numeral 51 indicates a bracket secured to the crankcase 13 for supporting the oil level detecting device 50.

Reference numeral 61 indicates a valve operating mechanism provided in the cylinder head 21, which includes an air intake valve 24 for opening/closing an opening of an air intake port 22 leading to a combustion chamber 29 and a discharge valve 25 for opening/closing an opening of a discharge port 23 leading to the combustion chamber 29. Reference numeral 69 indicates one of a plurality of oil dippers fixed to the connecting rod 18 for dipping up the oil 12 stored in the oil storing chamber 68.

Figure 2:
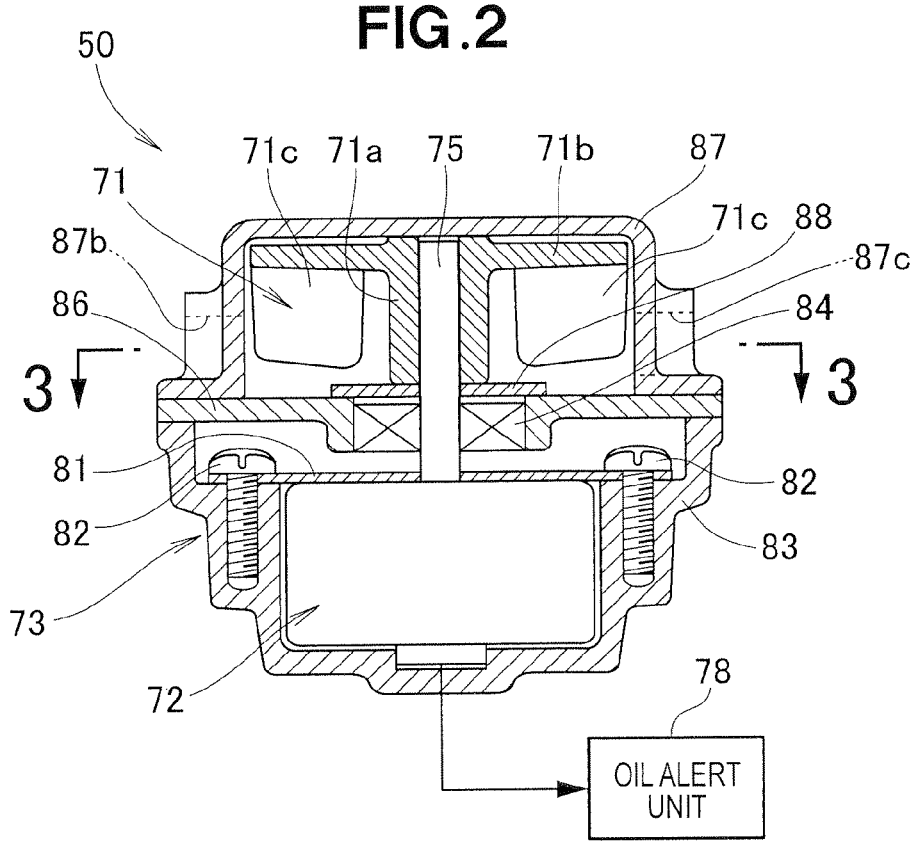
FIG. 2 is a sectional view of the oil level detecting device.

FIG. 2 is a sectional view of the embodiment of the oil level detecting device 50 of the present invention, which includes a fan 71 rotatable by a flow of the oil, a power generator 72 for converting the rotation of the fan 71 into electric energy, i.e. for generating electric power, and a casing 73 having these fan 71 and power generator 72 accommodated therein.

The electric fan 71 is an integrally-formed member that integrally has a boss section 71a fitted over a rotation shaft 75 of the power generator 72, a disk section 71b provided perpendicularly radially on an end portion of the boss section 71a, and a plurality of vanes 71c projecting radially from the disk section 71b for catching the oil.

The power generator 72 is connected with an oil alert unit 78, which is a control device for controlling operation of the engine 10 on the basis of electric power generated by the power generator 72. The electric power generated by the power generator 72 is delivered to the oil alert unit 78 where the amount or magnitude of the delivered electric power is compared with a predetermined value.

The casing 73 includes: a power generator casing 83 having the power generator 72 accommodated therein and having a mounting plate 81 of the power generator 72 secured thereto by means of screws 82; an oil seal holder 86 closing an opening of the power generator casing 83 and holding an oil seal 84 provided around the rotation shaft 75; a fan cover 87 provided adjacent to the oil seal holder 86 to cover the electric fan 71; and a plurality of screws (not shown) fastening together the power generator casing 83, oil seal holder 86 and fan cover 87. Reference numeral 88 indicates a shim supporting an end portion of the boss section 71a of the fan 71.

Figure 3:
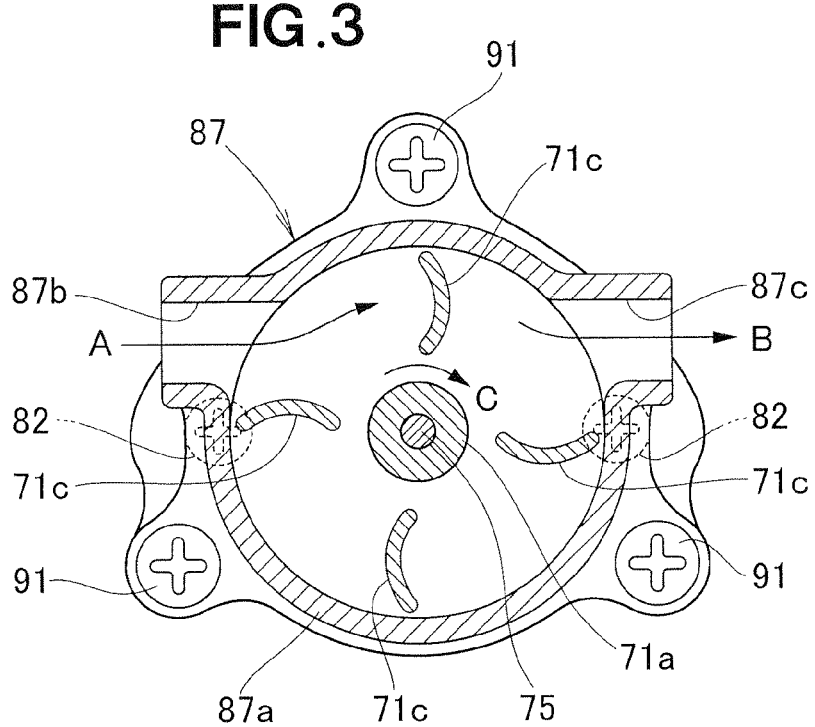
FIG. 3 is a sectional view taken along line 3-3 of FIG. 2.

FIG. 3 is a sectional view taken along line 3-3 of FIG. 2. The fan cover 87 has a cylindrical section 87a, and oil inlet and outlet ports 87b and 87c formed in the cylindrical section 87a in offset relation to the rotation shaft 75 of the power generator 72 and in horizontally-opposed relation to each other. Thus, the oil inlet and outlet ports 87b and 87c lie and operate in the horizontal direction. Oil having flown through the inlet port 87b into the fan cover 87 hits some of the vanes 71c of the fan 71 as indicated by arrow A and then flows out of the fan 71 through the outlet port 87c as indicated by arrow B, to thereby rotate the fan 71 as indicated by arrow C. The power generator casing 83, oil seal holder 86 and fan cover 87 are fastened together by means of screws 91.

Figure 4:
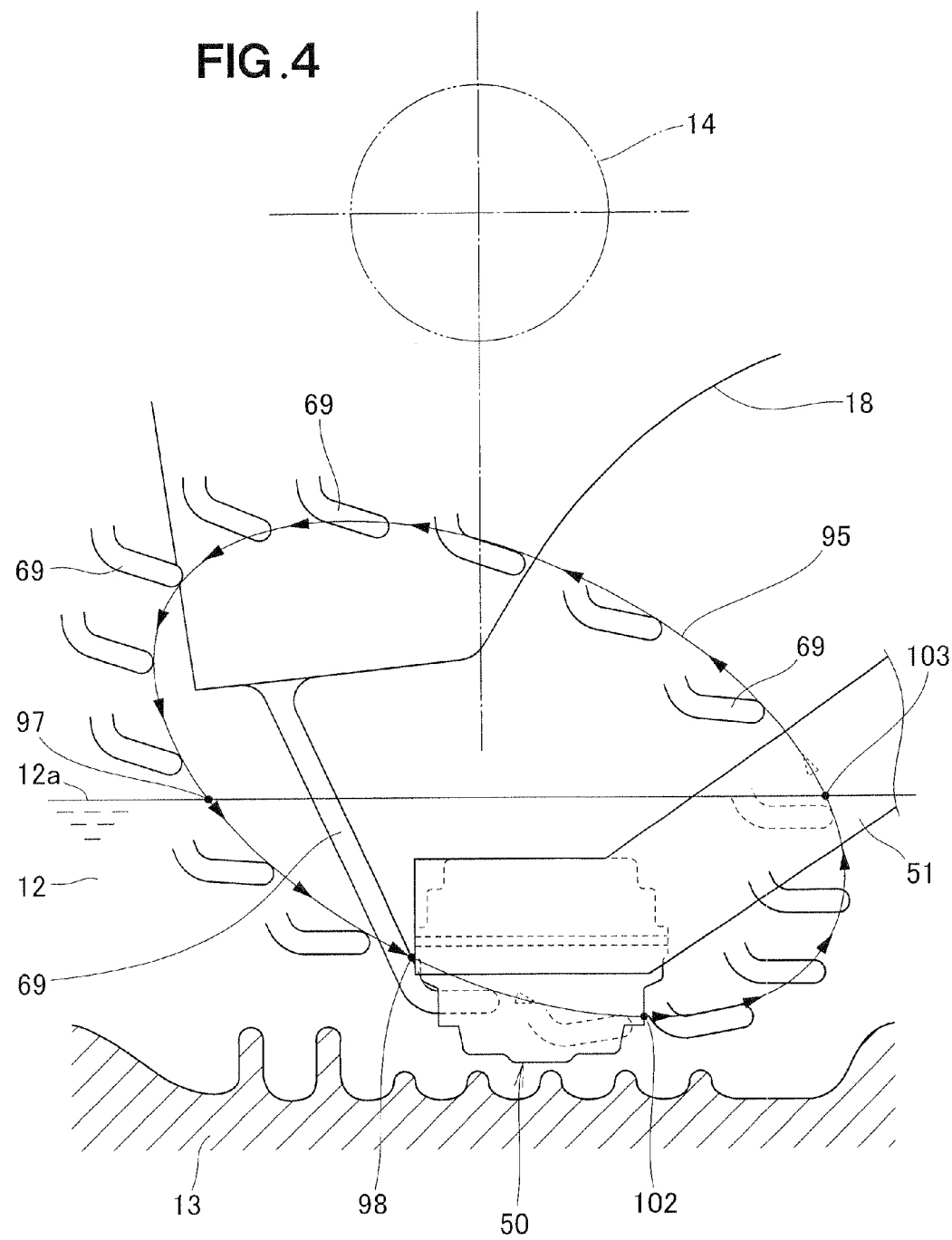
FIG. 4 is a schematic view illustrating an operation of oil dippers employed in the oil level detecting device.

FIG. 4 is a view explanatory of behavior of the oil dippers 69. Each of the oil dippers 69 is a member that dips up the stored oil 12 onto various slidingly-moving component parts of the engine 10 as the crankshaft 14 rotates within the crankcase 13. The distal end of each of the oil dippers 69 moves in an elliptic trajectory 95 as indicated by arrows.

Hereinafter, a point at which the distal end of a given one of the oil dippers 69 enters the stored oil 12 will be referred to as "oil surface entry point" 97, a point at which one end of the oil level detecting device 50 and the trajectory 95 intersect each other will be referred to as "first intersecting point" 98, a point at which the other end of the oil level detecting device 50 and the trajectory 95 intersect each other will be referred to as "second intersecting point" 102, and a point at which the distal end of the given oil dipper 69 leaves the stored oil 12 will be referred to as "oil surface leaving point" 103.

The trajectory portion from the oil surface entry point 97 to the first intersecting point 98 extends obliquely downwardly relative to the oil surface 12a, the trajectory portion from the first intersecting point 98 to the second intersecting point 102 extends substantially horizontally, and the trajectory portion from the second intersecting point 102 to the oil surface leaving point 103 extends obliquely upward. Note that the trajectory portion from the second intersecting point 102 to the oil surface leaving point 103 may sometimes extend substantially vertically upward depending on the height of the oil surface 12a.

It is known that, at the oil surface entry point 97, great fluctuation occurs in the oil surface particularly when the number of rotations of the engine is small, i.e. when the engine is rotating at low speed. When the number of rotations of the engine is great, the oil 12 is dipped up more frequently by the oil dippers 69, so that the oil surface 12 lowers more quickly.

Figure 5A:
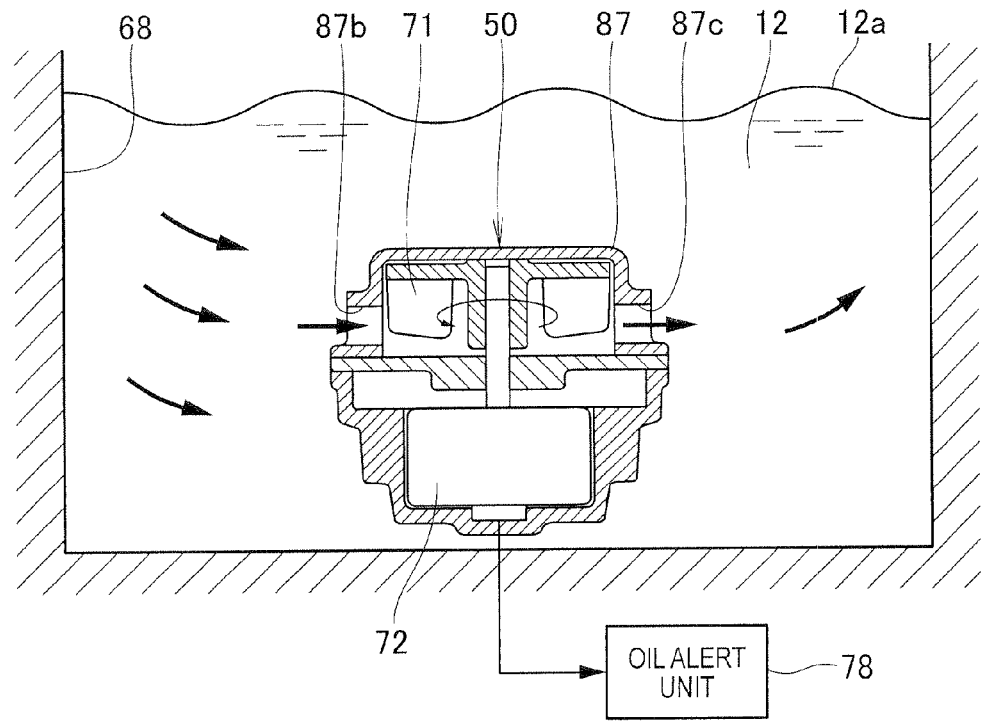
FIGS. 5A and 5B are schematic views illustrating an operation of the oil level detecting device.
Figure 5B:
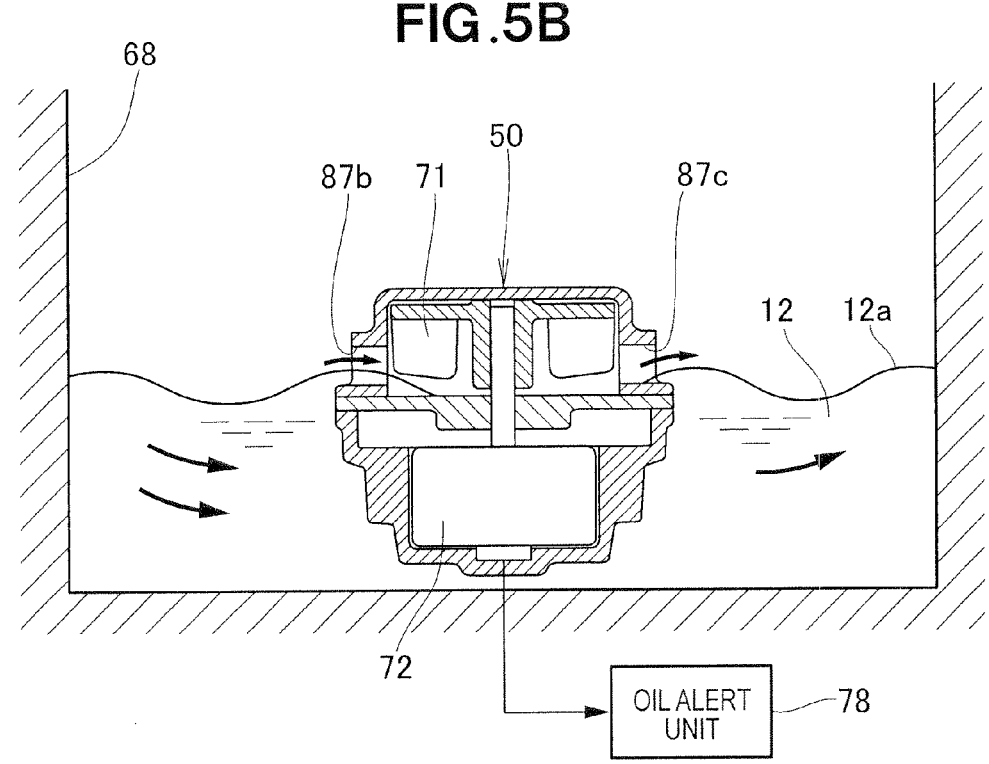

Next, discussion will be made as to an operation or behavior of the oil level detecting device 50. FIGS. 5A and 5B are views explanatory of behavior of the oil level detecting device 50. When the oil 12 is stored in a sufficient amount in the oil storing chamber 68, i.e., the oil surface 12a is sufficiently higher than the positions of the oil inlet and outlet ports 87b and 87c of the oil level detecting device 50, the surface 12a of the oil is ruffled (i.e., caused to wave) by the oil dippers 69 during operation of the engine. While there is produced a horizontal flow in the oil 12 as indicated by arrows, the oil 12 flows through the oil inlet port 87b of the oil level detecting device 50 into the fan cover 87, rotates the fan 71 and then flows out through the oil outlet port 87c. In response to the rotation of the fan 71, electric power is generated by the power generator 72, and the thus-generated electric power is delivered to the oil alert unit 78. When the delivered electric power is greater than a predetermined amount or value, the oil alert unit 78 determines that the stored amount of the oil 12 is currently at a sufficient high and hence non-problematic level (i.e., the oil level is sufficiently high).

After the surface 12a of the ruffling oil 12 in the oil storing chamber 68 has lowered to given vertical positions of the oil inlet and outlet ports 87b and 87c of the oil level detecting device 50 as shown in FIG. 5B, the oil 12 flows through the oil inlet port 87b into the fan cover 87 when the waves of the oil 12 are high, but does not flow through the oil inlet port 87b into the fan cover 87 when the waves of the oil 12 are low. Namely, when the surface 12a of the ruffling or waving oil 12 in the oil storing chamber 68 is lower than the given vertical positions of the oil inlet and outlet ports 87b and 87c as shown in FIG. 5B, the oil 12 flows through the oil inlet port 87b into the fan cover 87 only intermittently and thereby rotates the fan 71 only intermittently, so that the electric power generated by the power generator 72 decreases as compared to that generated in the case of FIG. 5A. When the delivered electric power is of less than a predetermined amount or value, the oil alert unit 78 determines that the stored amount of the oil 12 is currently at an insufficient and abnormal level, and then issues an alarm and deactivates the engine, for example, by compulsorily interrupting the ignition signal.

Because the oil level detecting device 50 outputs to the oil alert unit 78 the amount of electric power generated by the flow of the oil 12 rotating the fan 71 as set forth above, it is less subject to the ruffling or waving, by the oil dippers 69, of the oil surface than the conventionally-known float-type oil level detecting devices, so that it is capable of high-accuracy oil level detection.

Figure 6A:
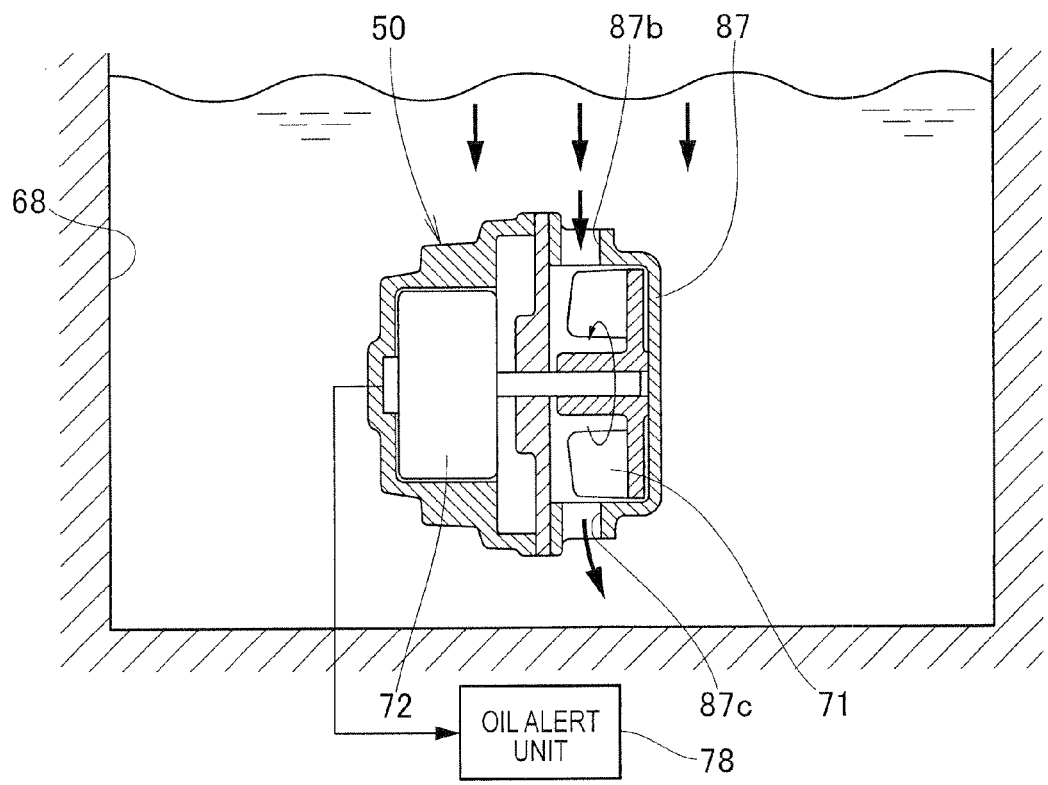
FIGS. 6A and 6B are schematic views illustrating an operation of the oil level detecting device disposed in a laterally-facing orientation vertically turned 90° from the oil level detecting device shown in FIGS. 5A and 5B.
Figure 6B:
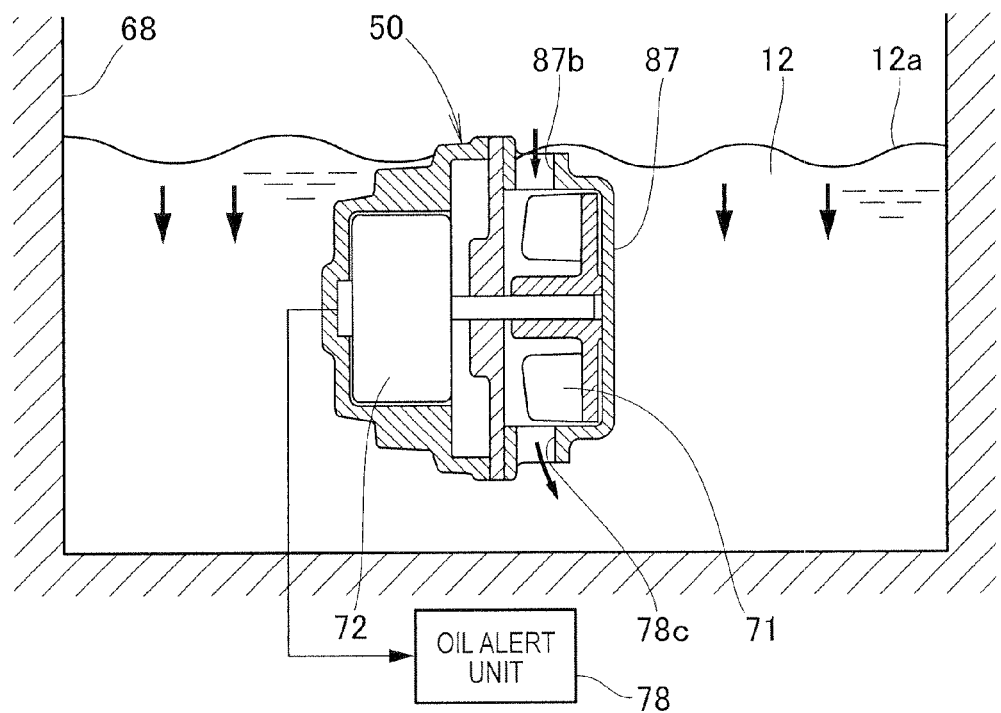

FIGS. 6A and 6B are views explanatory of behavior of the oil level detecting device 50 disposed in a laterally-facing orientation vertically turned 90° from the oil level detecting device 50 shown in FIGS. 5A and 5B. Namely, in FIGS. 6A and 6B, the oil inlet and outlet ports 87b and 87c are located in vertically-opposed relation to each other and lie and operate in the vertical direction.

When the oil 12 is stored in a sufficient amount in the oil storing chamber 68, and in an area where the oil 12 is caused to flow in an up-to-down direction, as indicated by arrows, via the oil dippers 69 (FIG. 4), the oil flows through the oil inlet port 87b of the oil level detecting device 50 into the fan cover 87, rotates the fan 71 and then flows out through the oil outlet port 87c. In response to rotation of the fan 71, electric power is generated by the power generator 72, and the thus-generated electric power is delivered to the oil alert unit 78. When the delivered electric power is of more than the predetermined amount, the oil alert unit 78 determines that the stored amount of the oil 12 is currently at a sufficient and hence non-problematic level.

After the surface 12a of the ruffling or waving oil 12 in the oil storing chamber 68 has lowered to a given vertical position of the oil inlet port 87b of the oil level detecting device 50, the oil 12 flows through the oil inlet port 87b into the fan cover 87 when the waves of the oil 12 are high, but does not flow through the oil inlet port 87b into the fan cover 87 when the waves of the oil 12 are low. Namely, the oil 12 flows through the oil inlet port 87b into the fan cover 87 only intermittently and thereby rotates the fan 71 only intermittently, so that the electric power generated by the power generator 72 decreases. When the delivered electric power is of less or smaller than the predetermined amount or value, the oil alert unit 78 determines that the stored amount of the oil 12 is currently at an insufficient and abnormal level, and then issues an alarm and deactivates the engine, for example, by compulsorily interrupting the ignition signal.

Further, even when the oil surface 12a is lower than the oil inlet port 87b as a result of the oil dipping-up operation by the oil dippers 69, the fan 71 can generate electric power by being rotated by drips of the oil if the oil inlet port 87b is placed at a suitable position to which the oil 12 drips within the crankcase 13; thus, the detecting device 50 can detect an oil drip amount corresponding to the oil level and thereby detect the current oil amount in the oil storing chamber 68.

FIG. 7 is a flow chart showing behavior of the embodiment of the oil level detecting device 50 of the present invention, which particularly shows control operations performed by the oil alert unit 78.

At step ST01, the engine 10 is activated, and simultaneously with the activation of the engine 10, the oil alert unit 78 activates a timer (not shown) with the timer set at a zero value of time t (t=0). At next step ST02, it is determined whether or not three seconds has passed since the activation of the engine, i.e. timer. If three seconds has passed (t=3) as determined at step ST02, control proceeds to step ST03, but if three seconds has not yet passed, control reverts to step ST02.

At step ST03, a determination is made as to whether or not an amount of electric power P currently generated by the power generator 72 is greater than a predetermined amount of electric power Pst. If P>Pst (i.e., YES determination at step ST03), control goes to step ST04, while, if P≦Pst (i.e., NO determination at step ST03), control proceeds to step ST05.

Then, at step ST04, the time t is reset to zero (t=0), and then control reverts to step ST02. At step ST05, the oil alert unit 78 determines that there has occurred abnormality with the stored oil level, and then it issues an engine deactivation instruction. Thus, the engine 10 is deactivated at step ST06.

As clearly seen from FIGS. 1 and 5A and 5B, the engine 10 includes: the oil storing chamber 68 provided in the crankcase 13 and having the oil 12 stored therein; the oil dippers 69 for dipping up the oil 12 to lubricate various component parts of the engine 10; and the oil level detecting device 50 constructed to detect the oil level in the oil storing chamber 68. The oil level detecting device 50 includes: the fan 71 rotatable by a flow of the oil 12 within the oil storing chamber 68; the power generator 72 operatively connected with the fan 71; and the oil alert unit 78 as an oil level determination means for determining the oil level on the basis of an amount or magnitude of electric power generated by the power generator 72. Namely, the fan 71 is rotated by a flow of the oil 12 and the oil level is determined on the basis of the electric power generated by the power generator 72 through rotation of the fan 72, and thus, even when fluctuation occurs in the oil surface 12a due to the operation of the oil dippers 69, the oil level detecting device 50 can detect the oil level in a stable manner and thereby achieve an enhanced oil level detection accuracy.

Whereas the embodiment of the oil level detecting device 50 has been described above as disposed in the orientation where the oil inlet and outlet ports 87b and 87c are opposed to each other in the horizontal or vertical direction, i.e. lie along a horizontal or vertical flow of the oil 12, the present invention is not so limited. For example, the oil level detecting device 50 may be disposed in any other orientation, e.g. inclined orientation, such that the oil inlet and outlet ports 87b and 87c lie along a flow of the oil 12 corresponding to their respective positions within the oil storing chamber 68.

The oil level detecting device 50 of the present invention is well suited for application to general-purpose engines.

Obviously, various minor changes and modifications are possible in light of the above teaching. It is therefore to be understood that within the scope of the appended claims the invention may be practiced otherwise than as specifically described.

What is claimed is:

1. An oil level detecting device adapted to be disposed within an oil storing chamber defined in a crankcase of an engine, for detecting a level of oil which is stored in the oil storing chamber, dipped up for lubricating the engine and thus caused to flow within the oil storing chamber, the oil level detecting device comprising:

a fan rotatable by a flow of the oil within the oil storing chamber;

a power generator operatively connected with the fan to generate electric power corresponding in amount to an amount of rotation of the fan; and oil level determination means for determining the level of oil in the oil storing chamber on a basis of the amount of the electric power generated by the power generator.

2. The oil level detecting device of claim 1, wherein the oil level determination means comprises an oil alert unit which, when the amount of the electric power generated by the power generator is larger than a predetermined value, judges the oil within the oil storing chamber to be at a sufficient level and, when the amount of the electric power generated by the power generator is smaller than the predetermined value, judges the oil within the oil storing chamber to be at an insufficient level and outputs a signal for deactivating the engine.

* * * * *